United States Patent
Mukherjee et al.

(10) Patent No.: US 7,555,703 B2
(45) Date of Patent: *Jun. 30, 2009

(54) METHOD AND APPARATUS FOR REDUCING FALSE ERROR DETECTION IN A MICROPROCESSOR

(75) Inventors: Shubhendu S. Mukherjee, Framingham, MA (US); Joel S. Emer, Acton, MA (US); Steven K. Reinhardt, Ann Arbor, MI (US); Christopher T. Weaver, Marlboro, MA (US); Michael J. Smith, Marlborough, MA (US)

(73) Assignee: Intel Corporation, Santa Clara, CA (US)

( * ) Notice: Subject to any disclaimer, the term of this patent is extended or adjusted under 35 U.S.C. 154(b) by 759 days.

This patent is subject to a terminal disclaimer.

(21) Appl. No.: 10/871,430

(22) Filed: Jun. 17, 2004

(65) Prior Publication Data

US 2005/0283716 A1 Dec. 22, 2005

(51) Int. Cl.
*G06F 11/00* (2006.01)
(52) U.S. Cl. ...................... 714/800; 712/244
(58) Field of Classification Search ................. 714/48, 714/764, 754
See application file for complete search history.

(56) References Cited

U.S. PATENT DOCUMENTS

| | | | | |
|---|---|---|---|---|
| 3,531,631 A * | 9/1970 | Burgess | ........... | 714/805 |
| 4,224,681 A * | 9/1980 | Lewine | ........... | 708/531 |
| 4,794,517 A * | 12/1988 | Jones et al. | ........... | 712/32 |
| 5,033,050 A * | 7/1991 | Murai | ........... | 714/800 |
| 5,495,590 A * | 2/1996 | Comfort et al. | ........... | 712/228 |
| 5,535,226 A * | 7/1996 | Drake et al. | ........... | 714/773 |
| 5,872,910 A * | 2/1999 | Kuslak et al. | ........... | 714/41 |
| 6,247,118 B1 * | 6/2001 | Zumkehr et al. | ........... | 712/228 |
| 6,457,119 B1 * | 9/2002 | Boggs et al. | ........... | 712/227 |
| 6,543,028 B1 * | 4/2003 | Jamil et al. | ........... | 714/800 |
| 6,675,341 B1 * | 1/2004 | Chen et al. | ........... | 714/753 |
| 6,738,892 B1 * | 5/2004 | Coon et al. | ........... | 712/24 |
| 6,785,842 B2 * | 8/2004 | Zumkehr et al. | ........... | 714/17 |
| 2002/0078334 A1 * | 6/2002 | Roth et al. | ........... | 712/244 |
| 2002/0199151 A1 * | 12/2002 | Zuraski, Jr. | ........... | 714/763 |

(Continued)

FOREIGN PATENT DOCUMENTS

EP 0 596 144 A1 5/1994

(Continued)

OTHER PUBLICATIONS

Ziegler, J.F. et al., *IBM Experiments in Soft Fails in Computer Electronics*, IBM Journal of Research and Development, vol. 40, No. 1, Jan. 1996, pp. 3-18.

(Continued)

*Primary Examiner*—Jacques Louis-Jacques
*Assistant Examiner*—Sam Rizk
(74) *Attorney, Agent, or Firm*—Trop, Pruner & Hu, P.C.

(57) ABSTRACT

A technique to reduce false error detection in microprocessors. A pi bit is propagated with an instruction through an instruction flow path. When a parity error is detected, the pi bit is set, instead of raising a machine check exception. Upon reaching a commit point, the processor can determine if the instruction was on a wrong path.

40 Claims, 7 Drawing Sheets

U.S. PATENT DOCUMENTS

2004/0139374 A1* 7/2004 Meaney et al. .................. 714/48
2005/0138478 A1* 6/2005 Safford et al. .................. 714/38

FOREIGN PATENT DOCUMENTS

| | | |
|---|---|---|
| JP | 63-012030 | 1/1988 |
| JP | 03-209523 | 9/1991 |
| JP | 04-264624 | 9/1992 |
| JP | 06-290045 | 10/1994 |

OTHER PUBLICATIONS

Normand, Eugene, *Single Event Upset at Ground Level*, IEEE Transactions on Nuclear Science, vol. 43, No. 6, Dec. 1996, pp. 2742-2750.

Choi, Youngsoo et al., *The Impact of If-Conversion and Branch Prediction on Program Execution on the Intel® ItaniumTM Processor*, Proceedings of the 34th Annual International Symposium on Microarchitecture, Austin, TX, Dec. 1-5, 2001, pp. 182-191.

Manne, Srilatha et al., *Pipeline Gating: Speculation Control for Energy Reduction*, Proceedings of the 25th Annual International Symposium on Computer Architecture, Barcelona, Spain, Jun. 27-Jul. 1, 1998, pp. 132-141.

Mukherjee, Shubhendu S. et al., *Detailed Design and Evaluation of Redundant Multithreading Alternatives*, Proceedings of the 29th Annual International Symposium on Computer Architecture, Anchorage, AK, May 25-29, 2002, pp. 99-110.

Mukherjee, Shubhendu S. et al., *A Systematic Methodology to Compute the Architectural Vulnerability Factors for a High-Performance Microprocessor*, Proceedings of the 36th Annual International Symposium on Microarchitecture, Anaheim, CA, Dec. 3-5, 2003, pp. 29-40.

Reinhardt, Steven K. et al., *Transient Fault Detection via Simultaneous Multithreading*, Proceedings of the 27th Annual International Symposium on Computer Architecture, Vancouver, BC, Jun. 10-14, 2000, pp. 25-36.

European Patent Office, International Search Report and Written Opinion for International Application No. PCT/US2005/017772, 12 pages, Oct. 18, 2005.

U.S. Patent and Trademark Office Action in Related U.S. Appl. No. 10/872,109, filed Feb. 21, 2008, pp. 1-15, along with the Reply to Office Action which was filed on May 19, 2008, pp. 1-8.

German Office Action dated Feb. 1, 2008 with English Language Translation.

Chinese Patent Office, First Office Action for Chinese Application No. 200580019724.X, 10 pgs., Mar. 7, 2008.

Japanese Patent Office Official Action dated Jul. 1, 2008 with English Language Translation, 11 Pages Total.

Japanese Patent Office, Office Action dated Mar. 10, 2009 in a related application, pp. 1-9.

* cited by examiner

METHOD AND APPARATUS FOR REDUCING FALSE ERROR DETECTION IN A MICROPROCESSOR

RELATED APPLICATIONS

This application relates to the following commonly assigned co-pending applications filed on even date herewith and entitled: "Reducing False Error Detection In A Microprocessor By Tracking Instructions Neutral To Errors," Ser. No. 10/871,429, filed Jun. 17, 2004; and "Reducing False Error Detection In A Microprocessor By Tracking Dynamically Dead Instructions," Ser. No. 10/872,109, filed Jun. 17, 2004.

BACKGROUND INFORMATION

Transient faults due to neutron and alpha particle strikes are emerging as a significant obstacle to increasing processor transistor counts in future process technologies. Although fault rates of individual transistors may not rise significantly, incorporating more transistors into a device makes that device more likely to encounter a fault. As a result, it is expected that maintaining processor error rates at acceptable levels will require increasing design efforts.

Single bit upsets from transient faults have emerged as one of the key challenges in microprocessor design today. These faults arise from energetic particles, such as neutrons from cosmic rays and alpha particles from packaging materials. Transistor source and diffusion nodes can collect these charges. A sufficient amount of accumulated charge may invert the state of a logic device, such as an SRAM cell, a latch, or a gate, thereby introducing a logical fault into the circuit's operation. Because this type of fault does not reflect a permanent failure of the device, it is known as soft or transient error.

Soft errors are an increasing burden for microprocessor designers as the number of on-chip transistors continues to grow exponentially. The raw error rate per latch or SRAM bit is projected to remain roughly constant or decrease slightly for the next several technology generations. Thus, unless additional error protection mechanisms or usage of more robust technology (such as fully-depleted SOI), a microprocessor's error rate may grow in direct proportion to the number of devices added to a processor in each succeeding generation.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

Figure 1:
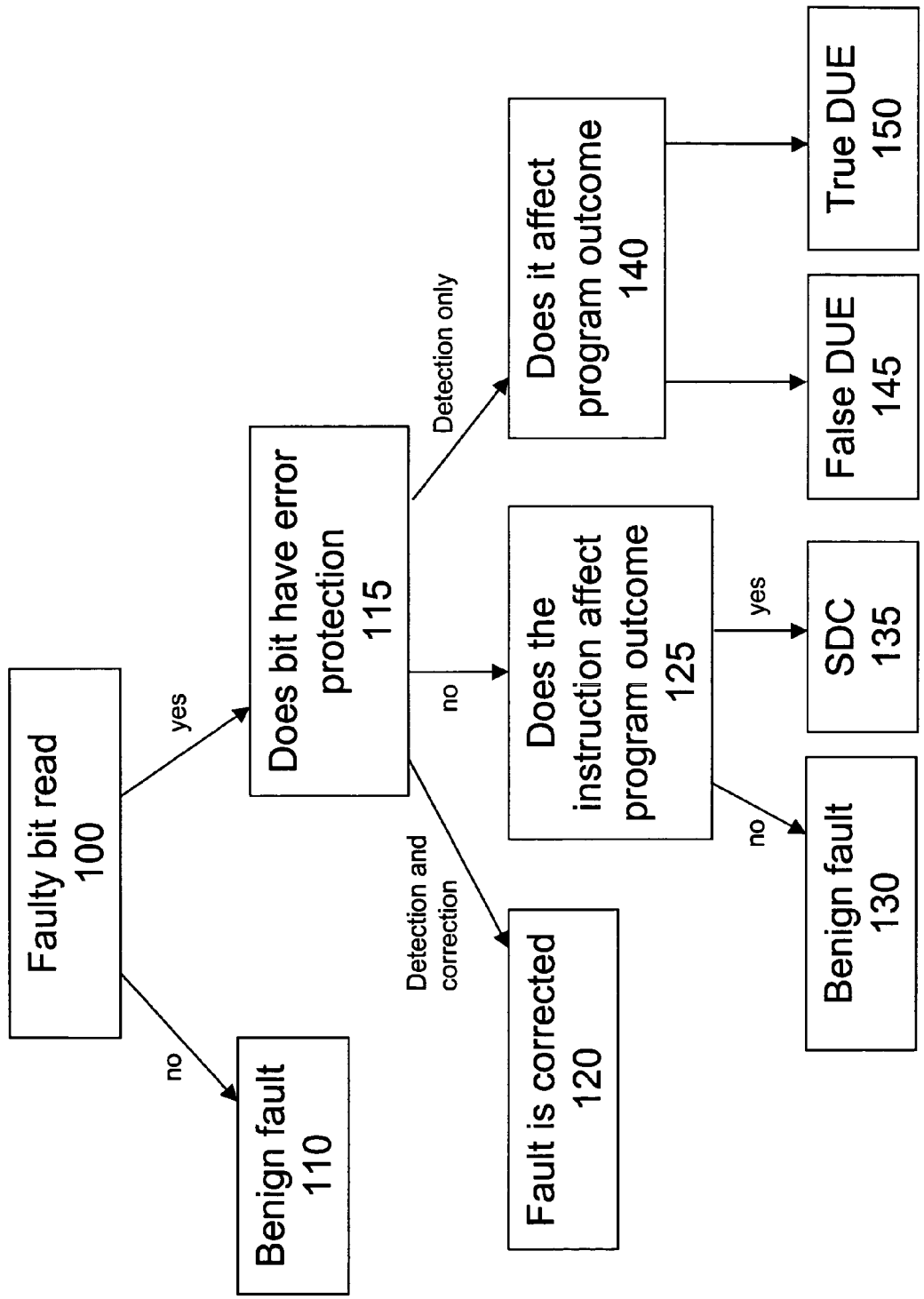
FIG. 1 is a block diagram of possible outcomes of a faulty bit in a microprocessor.
Figure 2A:
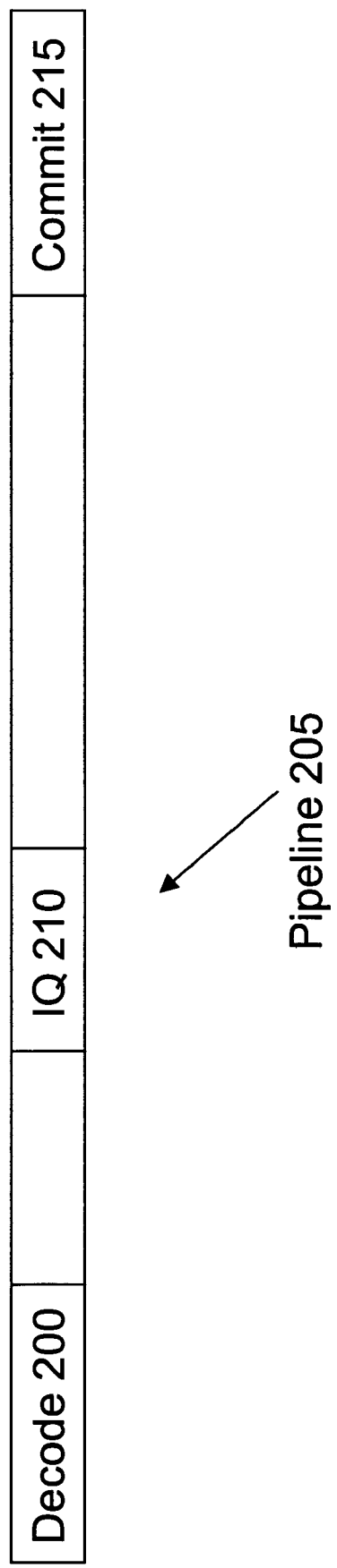
FIGS. 2a-2d is a block diagram illustrating one embodiment of the present invention when a pi bit is used along an instruction flow path to detect a soft error occurring on an instruction.
Figure 2B:
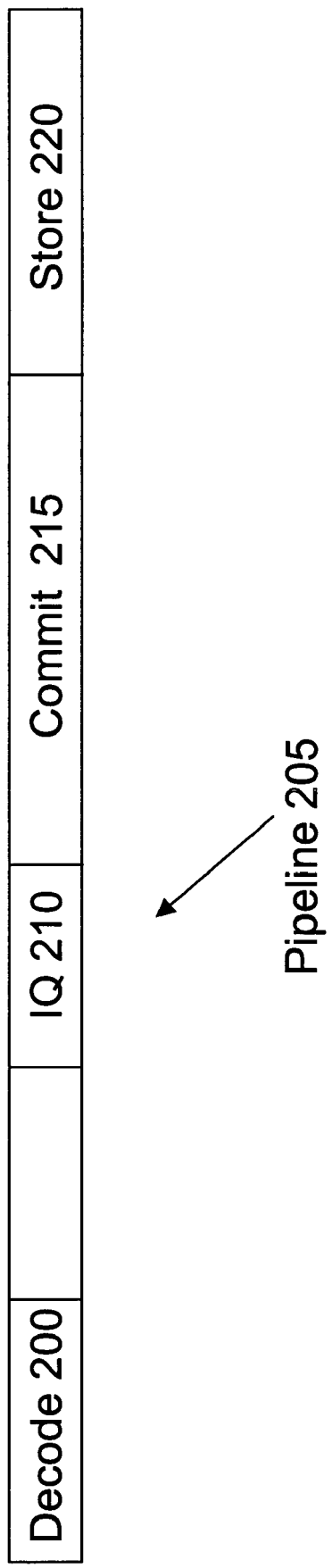
Figure 2C:
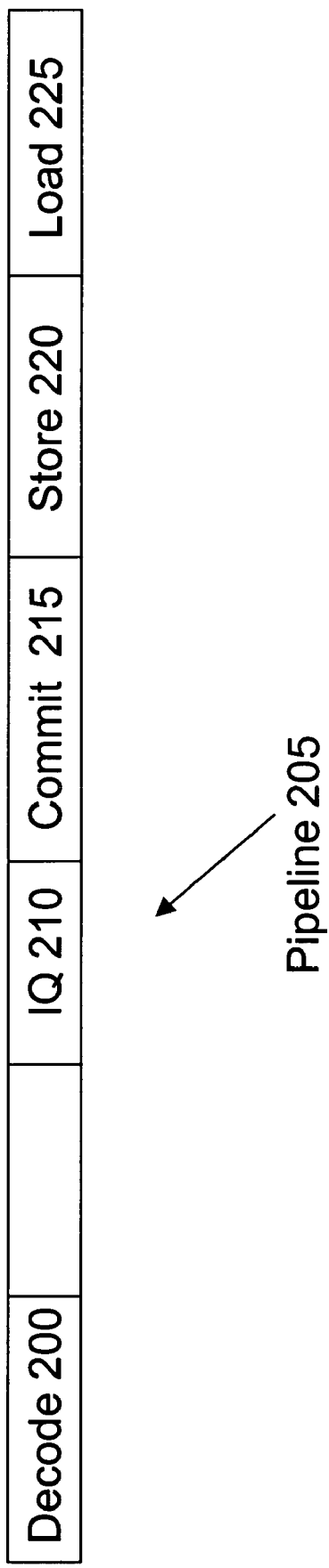
Figure 2D:
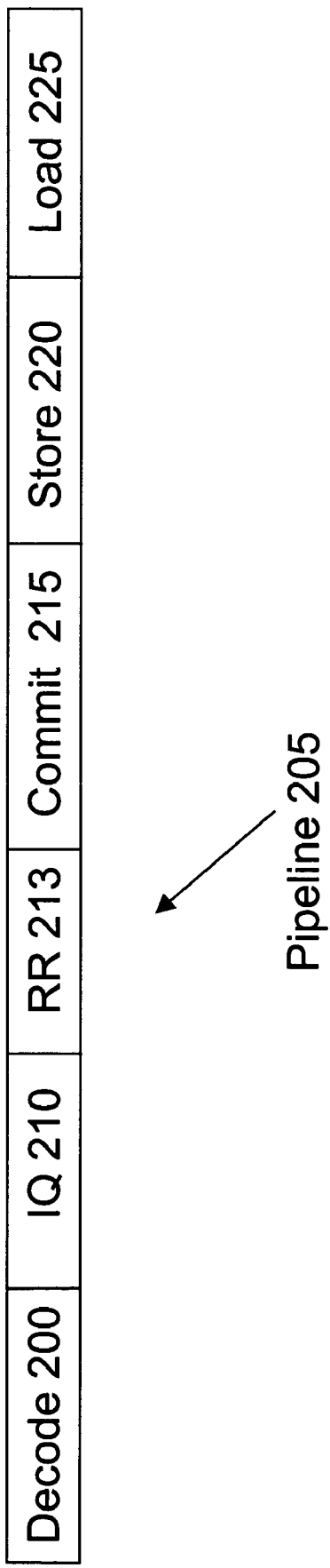

FIG. 1 illustrates possible outcomes of a single bit fault in a microprocessor. Initially, the microprocessor determines if a faulty bit was read 100. If a faulty bit was not read 110, then it is considered a benign fault and thus no error. If a faulty bit was read, the processor next determines if the bit has error protection 115. There are at least three possible outcomes to when a faulty bit is read. First, if the error protection was detected for the bit and corrected then the fault is considered corrected 120.

Secondly, if the bit does not have error protection, then the processor determines if the instruction would affect the outcome of the program 125. If the instruction does not affect the outcome of the program then the faulty bit is considered a benign fault 130. Faults 110, 120 and 130 all indicate non-error conditions because the fault had no effect or was detected and corrected.

If the instruction does affect the outcome of the program then it is considered a silent data corruption (SDC) 135. SDC 135 is the most insidious form of error, where a fault induces the system to generate erroneous outputs. To avoid SDC 135, designers may employ basic error detection mechanisms such as parity.

The third possible outcome to when a bit has error protection applies to this situation where the error is detected 140. With the ability to detect a fault but not correct it, the system avoids generating invalid outputs, but cannot recover when an error occurs. Thus, simple error detection does not reduce the error rate, but does provide fail-stop behavior and thereby reduces any data corruption. These types of errors are known as detected unrecoverable errors (DUE).

DUE events are further subdivided according to whether the detected errors would affect the final outcome of the execution. Benign detected errors are known as false DUE events 145 and others are known as true DUE events 150. In a microprocessor, false DUE events could arise from strikes on wrong-path instructions, falsely predicated instructions, and on correct-path instructions that do not affect the final program state, including no-ops, prefetches, and dynamically dead instructions.

One embodiment of the invention utilizes a mechanism to lower error rates by reducing the likelihood that a transient fault will cause the processor to declare an error condition. To track false DUE events, the microprocessor attaches a bit known as a pi bit, for Possibly Incorrect, to every instruction and potentially to various hardware structures. When an error is detected, the hardware will set the pi bit of the affected instruction instead of signaling the error. Later, by examining the pi bit and identifying the nature of the instruction, the hardware can decide if indeed a visible error has occurred.

Distinguishing false errors from true errors is complicated. The processor may not have enough information to make this distinction at the point it detects the error. For instance, when the instruction queue detects an error on an instruction, it may not be able to tell whether the instruction was a wrong path instruction or not. Consequently, the processor needs to propagate the error information down the pipeline and raise the error when it has enough information to make this distinction.

To propagate the error information between different parts of the microprocessor hardware the system makes use of the pi bit. The pi bit is logically associated with each instruction as it flows down the pipeline from decode to retirement.

FIGS. 2a-2d illustrate one embodiment of when a pi bit is used along an instruction flow path to detect a soft error occurring on an instruction. For an instruction, when the instruction is decoded 200, the pi bit is attached to the instruction and is initialized to zero. The pi bit is cleared to indicate the absence of any errors on the instruction. As the instruction flows through the pipeline 205, it will be transformed multiple times to adapt to the machine and written to and read from many different storage structures, such as, for example, an instruction queue.

When an instruction queue 210 receives the instruction, it stores the pi bit along with the instruction. If the instruction accumulates a single bit upset, a parity error will be flagged. On detection of an error, the instruction queue 210 sets the affected instruction's pi bit to one instead of raising a machine check exception. Subsequently, the instruction issues and flows down the pipeline 205.

Error checking and updates of the pi bit may also be employed at multiple stages in the pipeline and/or on multiple of various structures in the course of instruction execution. Error checking logic may take the form of parity checkers or various other error detection techniques that are known or otherwise available. Moreover, error detection and correction techniques may be used at these various stages or on various structures, with the pi bit being set in the case of an unrecoverable error.

Eventually, the instruction will commit 215. At the commit stage, the commit hardware has enough information to determine if the instruction was a wrong-path instruction. If so, the processor can ignore the pi bit, thus avoiding a false DUE event if the bit was set. If not, the processor has the option to raise the machine check error at the commit point 215 of the instruction.

The pi bit mechanism can also be generalized by attaching the pi bit to different objects flowing through the pipeline 205, as long as the pi bits are propagated correctly from object to object. For example, many microprocessors typically fetch instructions in multiples, sometimes called chunks. Chunks flow through the front end of the pipeline until they are decoded. A pi bit can be attached to each fetch chunk. If the chunk encounters an error, the processor can set the pi bit of the chunk. Subsequently, when the chunk is decoded into multiple instructions, the processor can copy the pi bit value of the chunk to initialize the pi bit of each instruction. Thus, the processor can use the pi bit to avoid false DUE events on structures in the front end of the pipeline before individual instructions are decoded.

In another embodiment, the processor can transfer pi bit information from instructions to registers, and thereby avoid false DUE events resulting from dynamically dead instructions on a register file. Instead of raising an error if an instruction's pi bit is set, the processor can transfer the instruction's pi bit to the destination register it writes. If no subsequent instructions reads this register, then the pi bit of the register will not be examined and, therefore, the processor may avoid an error on a first-level dynamically dead (FDD) instruction that wrote the register. However, when a subsequent instruction reads a register with the pi bit set, the processor may signal an error.

Alternatively, instead of raising the error if a register's pi bit is set, an instruction reading the register could OR the pi bits of all its source registers with its own pi bit and carry it along the pipeline. This embodiment would propagate the pi bit along dependence chains and allow a processor to track transitively dynamically dead (TDD) instructions as well. One way to track TDD instructions is to declare the error only when a processor interacts with the memory system or I/O devices. Thus, if the pi bit exists on every structure in a processor, except caches and main memory, and follow the same inheritance rule for pi bits as described above, then false errors on TDD instructions can be avoided as well. For this to occur, the system would flag errors only when a store instruction 220 or an I/O access is about to commit its data to the caches, memory systems, or I/O device. This propagation would not only avoid false DUE for TDD instructions on the register file, but also other structures along the pipeline through with the instructions and values flow.

In another embodiment, the processor may transfer the pi bit form an instruction or a register to memory values to track false DUE events in memory structures, such as store buffers and caches 220. The processor may attach a pi bit to each cache block and when a store instruction writes an address, the processor can transfer the store instruction's pi bit to the cache block. Subsequently, when a load 225 reads the cache block it could either examine the pi bit or transfer the pi bit to the register 213 it is loading. If the pi bit is transferred to the register 213, then the processor can also avoid signaling false DUE events arising out of dynamically dead memory values.

Alternatively, if a system had pi bits on the entire processor chip and memory system, the processor could track false errors on both FDD and TDD instructions via memory. In such instances, an error would only be raised when the processor makes an I/O access (e.g. uncached load or store) that has its pi bit set. This may allow designers to track errors across multiple processors in a shared-memory multiprocessor system.

Thus, in general, the pi bit may be attached to any object flowing through the pipeline or to any hardware structure, but the granularity of the pi bit depends on the implementation. For example, if a pi bit is attached to a 64-bit register value, then a single pi bit can only notify that there may have been an error in one of the 64 bits. Alternatively, if there is a pi bit for every byte, then the processor may identify which byte among the 64 bits may have had an error.

Figure 3:
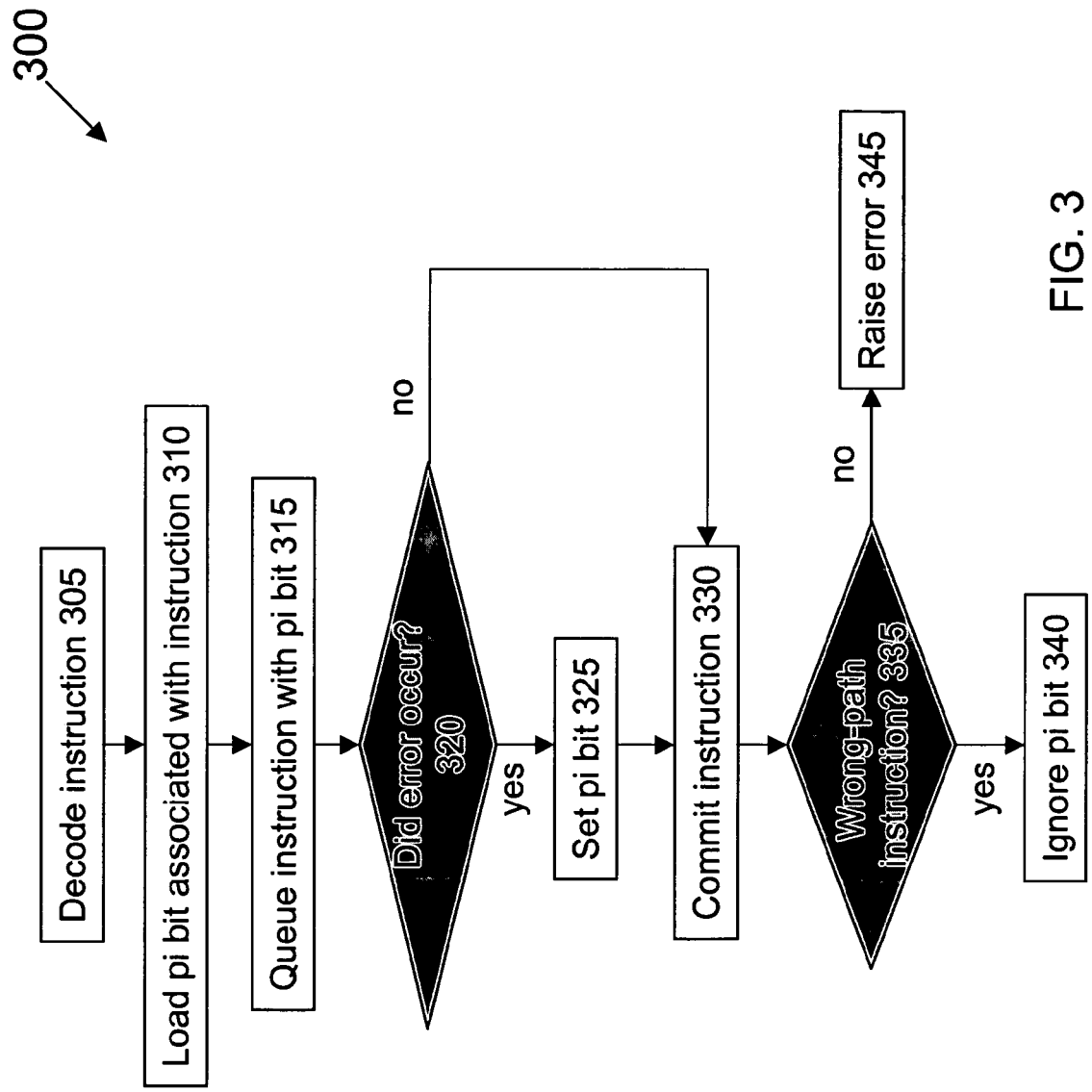
FIG. 3 is a flow diagram illustrating operations according to one embodiment of the present invention.

FIG. 3 is a flow diagram illustrating one embodiment of a method of detecting soft errors. In this particular embodiment, flowchart 300 illustrates a case where a processor determines if an instruction is a wrong-path instruction. Initially, when an instruction is decoded 305, a pi bit is associated with the instruction 310 and is initialized to zero. By initializing the pi bit to zero, this indicates absence of any errors on the instruction. Next, the instruction along with its pi bit is queued in the pipeline 315. As the instruction flows through the pipeline, it will be transformed multiple times to adapt to the machine and written to and read from many different storage elements.

During the time when the instruction flows through a pipeline the instruction may accumulate a single bit upset and a parity error may be flagged for that instruction 320. If an error was detected for the instruction, the pipeline may set the affected instruction's pi bit to one 325 instead of raising a machine check exception and eventually the instruction will commit 330. If an error is not detected, the instruction may eventually commit 330. The commit hardware can then determine if the instruction was a wrong-path instruction 335. If the instruction is determined to be a wrong-path instruction, then the pi bit is ignored 340, otherwise the processor has the option to raise an error, such as a machine check error 345.

Figure 4:
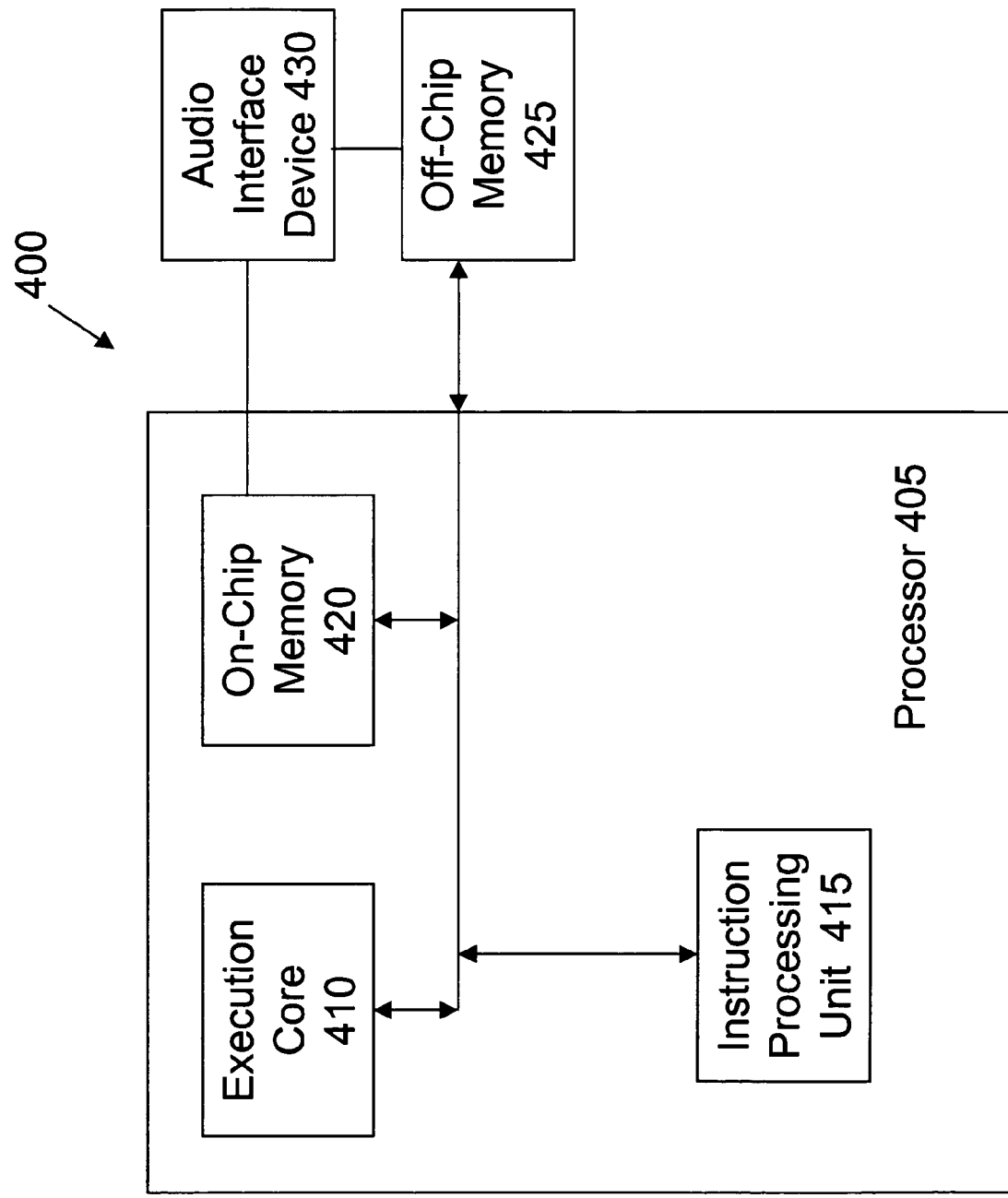
FIG. 4 is a block diagram illustrating an exemplary computer system which implements the present invention to detect soft errors.

FIG. 4 illustrates one typical system implementation for the detecting soft errors. A computer 400 is shown in which a processor 405 functions as a sole or one of a plurality of processors comprising the central processing unit (CPU) or units of the computer 400. Typically, the processor 405 is embodied in a single integrated circuit chip. The processor 405 may include an execution (processing) core 410, which has one or more execution units. A section of the processor 405 is dedicated to include an instruction processing apparatus 415. The instruction processing apparatus 415 is shown coupled to the core 410.

The invention is practiced according to the description above to execute an instruction in the core 410. The memory can be located on-chip (as shown by on-chip memory 420) or off-chip (as shown by off-chip memory 425). Typically, the on-chip memory can be a cache memory or part of the main memory (RAM). The off-chip memory is typically comprised of main memory (as well as off-chip cache, if present) and other memory devices, such as a disk storage medium. Both the on-chip memory 420 and the off-chip memory 425, either individually or separately, may be connected to various devices, such as, an audio interface device 430. However, it is to be noted, that the invention can be configured in other ways to process the instructions for execution by the core 410.

The pi bit mechanism reduces the false DUE events by reducing false errors. In the absence of a fault detection mechanism, such errors would not have affected the final outcome of a program. For example, a fault affecting the result of a dynamically dead instruction would not change the final program output, but could still be flagged by the hardware as an error. To avoid signaling such false errors, the pi bit mechanism modifies a pipeline's error detection logic to mark affected instructions and data as possibly incorrect, via the pi bit, rather than immediately signaling an error. Then, the processor signals an error only if it is determined later that the possibly incorrect value could have affected the program's output.

In some embodiments, the pi bit propagates error information so that the error can be raised at a later point in time when the processor can determine whether the error was actually a false or true error. Thus, the pi bit mechanism may decouple the detection of an error from the flagging of the error. This allows a microprocessor designer the choice to raise the error either on the use of a value or when the pi bit for a value goes out of scope.

Another advantage in some embodiments is that the parity checkers that detect the faults do not have to have the additional hardware in every place to raise a machine check exception. Instead, the error is posted in the pi bit. The commit hardware would be the only place that would require the hardware to raise the machine check exception.

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

What is claimed is:

1. A processor comprising:
   a decode module to receive an instruction;
   a storage structure coupled to the decode module for storing the instruction; and
   an instruction processing unit, coupled to the storage structure, comprised of a plurality of stages to process the instruction, and to update a bit to identify if a bit state change occurred to corrupt the instruction but not raise an exception on the identification, wherein said instruction processing unit is to determine if the instruction is a wrong path instruction, and if so to ignore said bit, and if the instruction is not a wrong path instruction to raise an error if the bit is updated.

2. The processor of claim 1 wherein the bit is initialized to a first value to indicate absence of any errors on the instruction.

3. The processor of claim 1 wherein the storage structure is an instruction queue.

4. The processor of claim 2 wherein the storage structure to set the instruction's error bit to a second value upon detection of an error.

5. The processor of claim 4 wherein the instruction and the bit are to flow through the plurality of stages.

6. The processor of claim 5 wherein the instruction is to commit with the bit in its second value.

7. The processor of claim 6 wherein the processor is to ignore the bit in its second value if the instruction is a wrong path instruction.

8. The processor of claim 6 wherein the processor to raise a machine check error if the instruction is not a wrong path instruction.

9. The processor of claim 1 wherein the instruction can be chunks, and each bit is attached to each fetch chuck.

10. The processor of claim 9 wherein the chunk is decoded into multiple instructions, the processor copies the bit value of the chunk to each of the multiple instructions.

11. The processor of claim 1 wherein the processor is to transfer the instruction's bit to a destination register.

12. The processor of claim 11 wherein if no subsequent instructions read the destination register, the bit of the register will not be examined.

13. The processor of claim 11 wherein the bits of all the instruction source registers are logically OR'ed with the instruction's own bit to provide a single bit.

14. The processor of claim 1 wherein the processor is to transfer the bit from an instruction to a memory module.

15. The processor of claim 14 wherein the processor is to attach a bit to each cache block, upon a store instruction writing an address, the processor is to transfer the store instruction's bit to the cache block.

16. The processor of claim 14 wherein a load reads the cache block to either examine the bit or to transfer the bit to the register it is loading.

17. The processor of claim 1 wherein the bit is a Possibly Incorrect (pi) bit.

18. A method comprising:
   decoding an instruction;
   loading a bit along with the instruction, the bit associated with a parity for the instruction;
   queuing the instruction;
   propagating the instruction through stages of a pipeline to process the instruction and to identify a state change at a first stage by setting the bit and not raising an exception; and
   determining if the instruction is a wrong path instruction at the commit point after the first stage and after having received additional information, ignoring the set bit if the instruction is a wrong oath instruction, and instead raising a machine check error if the instruction is not a wrong oath instruction.

19. An apparatus comprising:
a decode module to receive an entry;
a storage element to store a detection bit associated with the entry to identify if a bit state change occurred to corrupt the entry;
an instruction queue to process the entry;
an instruction flow path to propagate the flow of entries through multiple stages; and
a commit module to determine if the entry is on a wrong path at a later stage than a stage at which a bit state change was identified, and to ignore the bit state change if the entry is a wrong path entry, otherwise to raise an error.

20. The apparatus of claim 19 wherein the detection bit is a Possibly Incorrect (pi) bit.

21. The apparatus of claim 20 wherein the detection bit is associated with a parity for the instruction.

22. The apparatus of claim 19 wherein the detection bit is initialized to a first value to indicate absence of any errors on the entry.

23. The apparatus of claim 22 wherein the instruction queue to set the entry's detection bit to a second value upon detection of an error.

24. The apparatus of claim 23 wherein the entry to issue and flow through the plurality of stages of the instruction flow path.

25. The apparatus of claim 23 wherein the entry to commit with the detection bit in its second value.

26. The apparatus of claim 25 wherein the apparatus to ignore the detection bit if the commit module determines the entry is a wrong path entry.

27. The apparatus of claim 26 wherein the apparatus to raise a machine check error if the commit module determines the entry is not a wrong path entry.

28. A system comprising:
an off-chip memory to store an entry prior to fetching;
a processor coupled to the off-chip memory, wherein the processor further comprises:
a decode module to receive the entry;
a storage element to store a bit associated with the entry;
an instruction queue to process the entry;
an instruction flow path to propagate the flow of entries through stages; and
a commit module to determine if the entry is on a wrong path at a later stage than a stage at which a bit state change was identified, and to ignore the bit state change if the entry is a wrong path entry, otherwise to raise an error.

29. The system of claim 28 further comprising an audio interface coupled to the off-chip memory.

30. The system of claim 28 wherein the bit is a Possibly Incorrect (pi) bit.

31. The system of claim 28 wherein the bit identifies if a bit state change occurred to corrupt the entry.

32. The system of claim 31 wherein the bit state change is parity.

33. The system of claim 28 wherein the bit is initialized to a first value to indicate absence of any errors on the entry.

34. The system of claim 33 wherein the instruction queue to set the entry's bit to a second value upon detection of an error.

35. The system of claim 34 wherein the entry to issue and flow through the plurality of stages of the instruction flow path.

36. The system of claim 34 wherein the entry to commit with the bit in its second value.

37. The system of claim 36 wherein the system to ignore the bit if the commit module determines the entry is a wrong path entry.

38. The system of claim 37 wherein the system to raise a machine check error if the commit module determines the entry is not a wrong path entry.

39. The system of claim 28 further comprising an on-chip memory.

40. The system of claim 39 further comprising an audio interface device coupled to the on-chip memory.

* * * * *

UNITED STATES PATENT AND TRADEMARK OFFICE
CERTIFICATE OF CORRECTION

| | | |
|---|---|---|
| PATENT NO. | : 7,555,703 B2 | Page 1 of 1 |
| APPLICATION NO. | : 10/871430 | |
| DATED | : June 30, 2009 | |
| INVENTOR(S) | : Shubhendu S. Mukherjee et al. | |

It is certified that error appears in the above-identified patent and that said Letters Patent is hereby corrected as shown below:

Col. 7:
Line 1, "oath" should be --path--;
Line 3, "oath" should be --path--.

Signed and Sealed this
Eighteenth Day of September, 2012

David J. Kappos
*Director of the United States Patent and Trademark Office*